United States Patent
Bartz et al.

(10) Patent No.: US 7,103,530 B1
(45) Date of Patent: Sep. 5, 2006

(54) SYSTEM FOR INTEGRATING EVENT-RELATED INFORMATION AND TRACE INFORMATION

(75) Inventors: Manfred Bartz, Snohomish, WA (US); Craig Nemecek, Seattle, WA (US); Matt Pleis, Carnation, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 840 days.

(21) Appl. No.: 10/112,237

(22) Filed: Mar. 29, 2002

(51) Int. Cl.
*G06F 9/455* (2006.01)
*G06F 11/00* (2006.01)

(52) U.S. Cl. .............................. 703/27; 703/28; 714/28
(58) Field of Classification Search ................... 703/27, 703/28; 714/28
See application file for complete search history.

(56) References Cited

U.S. PATENT DOCUMENTS

| | | | |
|---|---|---|---|
| 6,173,419 B1 * | 1/2001 | Barnett ........................ | 714/28 |
| 6,314,529 B1 * | 11/2001 | Rana ........................... | 714/29 |
| 6,314,530 B1 * | 11/2001 | Mann .......................... | 714/38 |
| 2002/0035721 A1 | 3/2002 | Swoboda ....................... | 717/4 |
| 2003/0151427 A1 | 8/2003 | Piasecki et al. ............... | 326/47 |
| 2003/0223612 A1 | 12/2003 | Knorr et al. ................. | 381/370 |
| 2004/0193957 A1 | 9/2004 | Swoboda et al. ............. | 714/30 |
| 2004/0250150 A1 | 12/2004 | Swoboda et al. ........... | 713/330 |

OTHER PUBLICATIONS

Robert Boys "The Software Engineer's Guide to In-Circuit Emulation" Nohau, Oct. 16, 2000, 4 pages.*

* cited by examiner

*Primary Examiner*—Paul L. Rodriguez
*Assistant Examiner*—Dwin M. Craig

(57) ABSTRACT

An emulation and debugging system that includes an in-circuit emulator couplable to a microcontroller. The in-circuit emulator is adapted to execute an event thread in lock-step with the microcontroller. Event information generated as a result of executing the event thread is sampled at selected points and the sampled event information is stored in memory. Trace information is also recorded at the selected points. The sampled event information and the recorded trace information are time-stamped. In one embodiment, a display device is coupled to the in-circuit emulator. The display device is used for displaying analog and/or digital waveforms representing the sampled event information and the recorded trace information. Accordingly, an in-circuit emulator system can also function as an oscilloscope and/or as a logic analyzer, allowing a user to view event and trace information, along with other information, that are generated as part of the debugging process.

15 Claims, 8 Drawing Sheets

SYSTEM FOR INTEGRATING EVENT-RELATED INFORMATION AND TRACE INFORMATION

FIELD OF THE INVENTION

Embodiments of the present invention relate to the field of in-circuit emulation. More specifically, embodiments of the present invention relate to an emulation and debugging system for a microcontroller.

BACKGROUND ART

In-circuit emulators have been used for a number of years by software and hardware developers to help diagnose and debug hardware and software. In-circuit emulation is commonly used to analyze and debug the behavior of complex devices such as microcontrollers and microprocessors that have internal structures too complex to be modeled using simulation software.

A typical arrangement for in-circuit emulation includes a host computer system that is coupled to the microcontroller to be tested through some type of debug logic block. Instructions from the host computer system are loaded to the microcontroller through the debug logic block, which monitors the performance of the microcontroller as the instructions are executed by the microcontroller. As the microcontroller steps through the execution, the debug logic block collects information about the various components of the microcontroller (referred to herein as event information) and feeds that information back to the host computer system. Also, trace information (such as time stamps, register values, data memory content, etc.) may also be logged and fed back to the host computer system.

Thus, a plethora of information is available to the person doing the debugging (e.g., a designer). Oftentimes, an oscilloscope or logic analyzer, coupled to the host computer system or to the debug logic block, is used to present (display) selected event and trace information to the designer. Generally speaking, a logic analyzer is akin to an oscilloscope. Using an oscilloscope or logic analyzer, the designer can view multiple waveforms representing the event and trace information of particular interest.

Sometimes, instead of using an oscilloscope or logic analyzer, the designer reviews the event and trace information recorded by the host computer, and extracts portions of that information that are of interest. The designer can transfer the extracted information to one or more files in a format suitable for graphing software. The graphing software can then plot the data as a waveform that can then be viewed by the designer.

Each of the approaches described above has its disadvantages. The use of oscilloscopes and logic analyzers means that additional equipment must be purchased and maintained, and designers have to be trained in their use. Logic analyzers in particular are relatively expensive pieces of equipment. In addition, it is often difficult and sometimes virtually impossible for a logic analyzer or oscilloscope to have access to points (e.g., registers) and information internal to the device under test (e.g., the microcontroller). For example, the device under test may not be configured to output certain of its internal information to an external device such as an oscilloscope or logic analyzer.

The other approach requires the designer to read and understand the event and trace information, sort out the information that is of interest, and then transfer the information in a suitable format to software that can plot the information as a waveform. The act of filtering out the information of interest is burdensome and prone to error. For example, trace information is generally interspersed with other microcontroller instructions and calls; the designer would therefore have to sort through the entire set of information, separate out the trace information of interest, and arrange it in the proper sequence. Because the event and trace information are typically plotted versus time, the designer also needs to exercise care in selecting instances of event and trace information that will result in proper scaling of the waveform; that is, the shape of the waveform is greatly influenced by the choice of points to be plotted.

Another problem with the latter approach is that essentially the entire event and trace information is collected before the designer can filter out the information that is not of interest. The amount of event and trace information may be substantial and so may consume a significant portion of available memory resources. Conversely, if not enough memory is available, information may be lost.

Therefore, what is needed is a system that can be used for emulating and debugging devices such as microcontrollers, but that does not incur the hardware, maintenance and training costs associated with oscilloscopes and logic analyzers. In addition, what is needed is a system that can satisfy the above need and that can allow access to information that generally is difficult to access or cannot be accessed by conventional logic analyzers and oscilloscopes. What is also needed is a system that can satisfy the above needs but without placing undue burdens on the designer and on available computational (e.g., memory) resources. The present invention provides a novel solution to these needs.

SUMMARY OF THE INVENTION

Embodiments of the present invention provide a system that can be used for emulating and debugging devices such as microcontrollers, but that do not incur the hardware, maintenance and training costs associated with logic analyzers and oscilloscopes. Embodiments of the present invention also provide a system that can allow access to information that generally is difficult to access or cannot be accessed by conventional logic analyzers and oscilloscopes. Embodiments of the present invention also provide a system that can accomplish this without having to place undue burdens on the designer and on available computational (e.g., memory) resources.

Embodiments of the present invention pertain to an emulation and debugging system that includes an in-circuit emulator couplable to a microcontroller. The in-circuit emulator is adapted to execute an event thread in lock-step with the microcontroller. Event information generated as a result of executing the event thread is sampled at selected points and the sampled event information is stored in memory. Trace information is also recorded at the selected points. The sampled event information and the recorded trace information are time-stamped. In one embodiment, a display device is coupled to the in-circuit emulator. The display device is used for displaying waveforms representing the sampled event information and the recorded trace information. These waveforms may be analog waveforms and/or digital waveforms.

In one embodiment, the event thread includes a condition, and the selected points at which event information is sampled and trace information recorded correspond to that condition being detected.

In another embodiment, the in-circuit emulator includes trace memory. In one such embodiment, the trace memory is started and stopped in response to the condition being detected.

In yet another embodiment, the in-circuit emulator includes external pins. A signal received via the external pin can be sampled, time-stamped, correlated with the recorded trace information, and displayed as a waveform.

Thus, in its various embodiments, the in-circuit emulator system of the present invention can also function as an oscilloscope and/or as a logic analyzer, allowing a user to view event and trace information, along with other information, that are generated as part of the debugging process. As such, the need for separate and perhaps costly equipment such as an oscilloscope and/or a logic analyzer is obviated.

In addition, embodiments of the present invention can be used to readily monitor points (e.g., registers) and information internal to the device under test (e.g., the microcontroller), in particular points and information that a conventional logic analyzer or oscilloscope cannot access or can access only with difficulty. Embodiments of the present invention are particularly useful for configurable microcontroller designs because internal information of interest may not be readily accessible to an external device such as an oscilloscope or logic analyzer. For example, in configuring the microcontroller as an analog-to-digital converter (ADC), the designer may not have made provisions for certain internal information to be made available to external devices. However, according to the present invention, the information in the register(s) configured to implement the ADC can be monitored, sampled, and displayed. Trace information, for example, can be sorted from the other microcontroller instructions and calls, placed into the proper sequence according to time stamps, and plotted as a waveform (or waveforms).

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
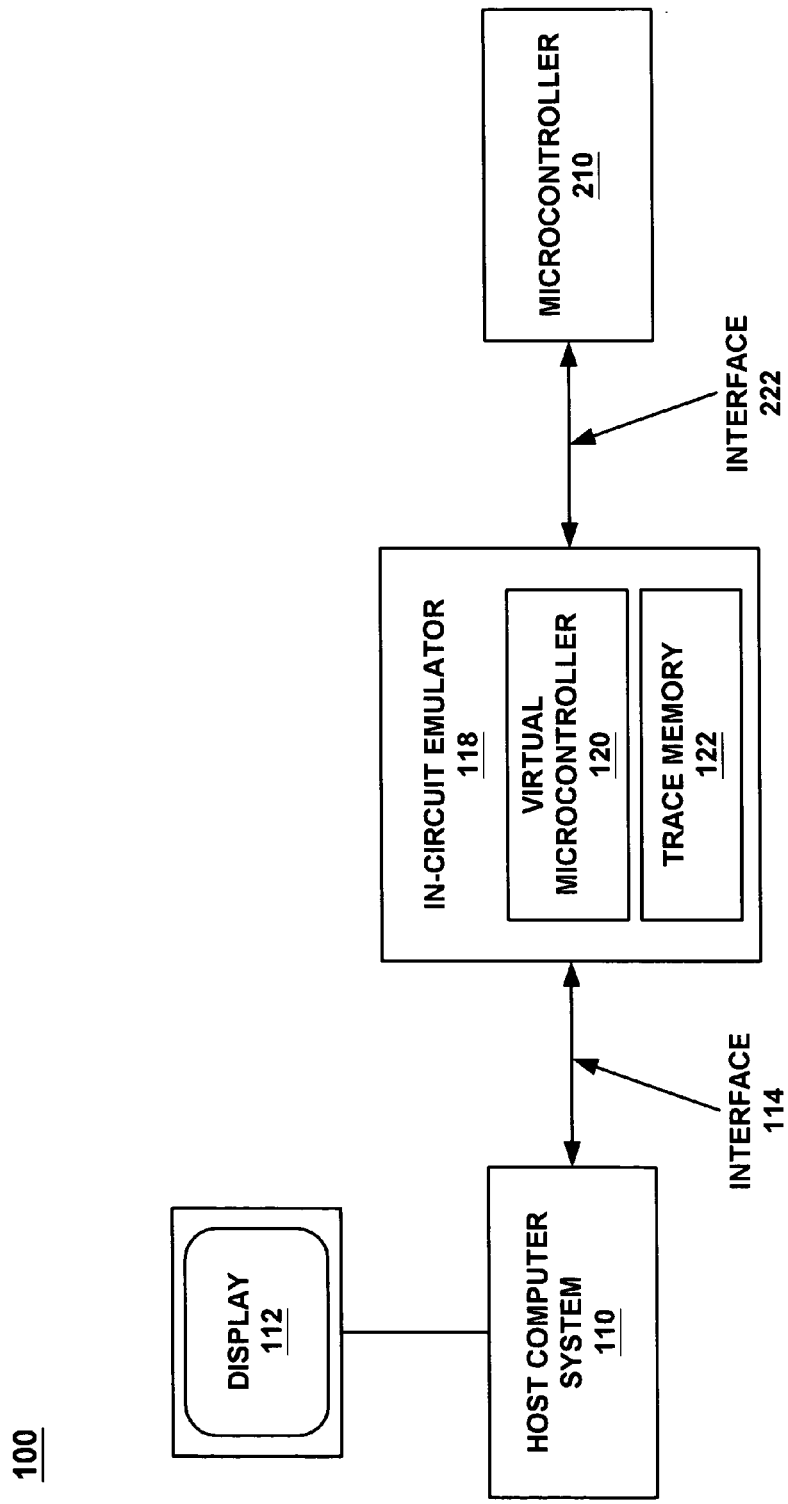
FIG. 1A is a block diagram of an exemplary in-circuit emulation system upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "sampling," "recording," "applying," "displaying," "parsing," "receiving," "correlating," "time-stamping" or the like, refer to actions and processes (e.g., processes 500 and 600 of FIGS. 5 and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

FIG. 1A is a block diagram of an exemplary in-circuit emulation system 100 upon which embodiments of the present invention may be implemented. In this embodiment, host computer system 110 is coupled via interface 114 to in-circuit emulator 118. Computer system 110 functions to control the debugging and emulation process. Coupled to computer system 110 is a display device 112 (e.g., a monitor) for displaying information.

In one embodiment, in-circuit emulator 118 includes a virtual microcontroller 120 that emulates microcontroller 210 (the device under test). Virtual microcontroller 120 may be a programmable logic device such as a field programmable gate array. In the present embodiment, virtual microcontroller 120 is designed to emulate the core functionality of microcontroller 210. Virtual microcontroller 120 operates in lock step (synchronization) with microcontroller 210. Event information such as input/output (I/O) reads, interrupt vectors, and other information needed for debugging are transferred from microcontroller 210 to in-circuit emulator 118 via interface 222. In-circuit emulator 118 provides computer system 110 with this information as well as information internal to microcontroller 210, such as the contents of internal registers and memories (refer to the discussion of FIG. 2B, below).

In the present embodiment, in-circuit emulator 118 also includes trace memory 122 for storing event and trace information generated according to the emulation and debugging process. In one embodiment, the information stored in trace memory 122 is time-stamped. This allows the information in trace memory 122 to be parsed by computer system 110 and displayed on display device 112 as one or more waveforms. Multiple waveforms can be displayed at the same time. Analog and/or digital waveforms may be displayed; that is, for example, a waveform may be continuous (e.g., non-linear), typical of an analog signal that may be displayed on an oscilloscope, or a waveform may be non-continuous (e.g., step-wise), typical of a digital signal that may be displayed on a logic analyzer. Thus, computer system 110, in combination with display device 112, can also function as an oscilloscope and/or as a logic analyzer, allowing a user to view event and trace information that are generated as part of the debugging process. As such, the need for a separate and perhaps costly oscilloscope and/or logic analyzer is obviated.

Figure 1B:
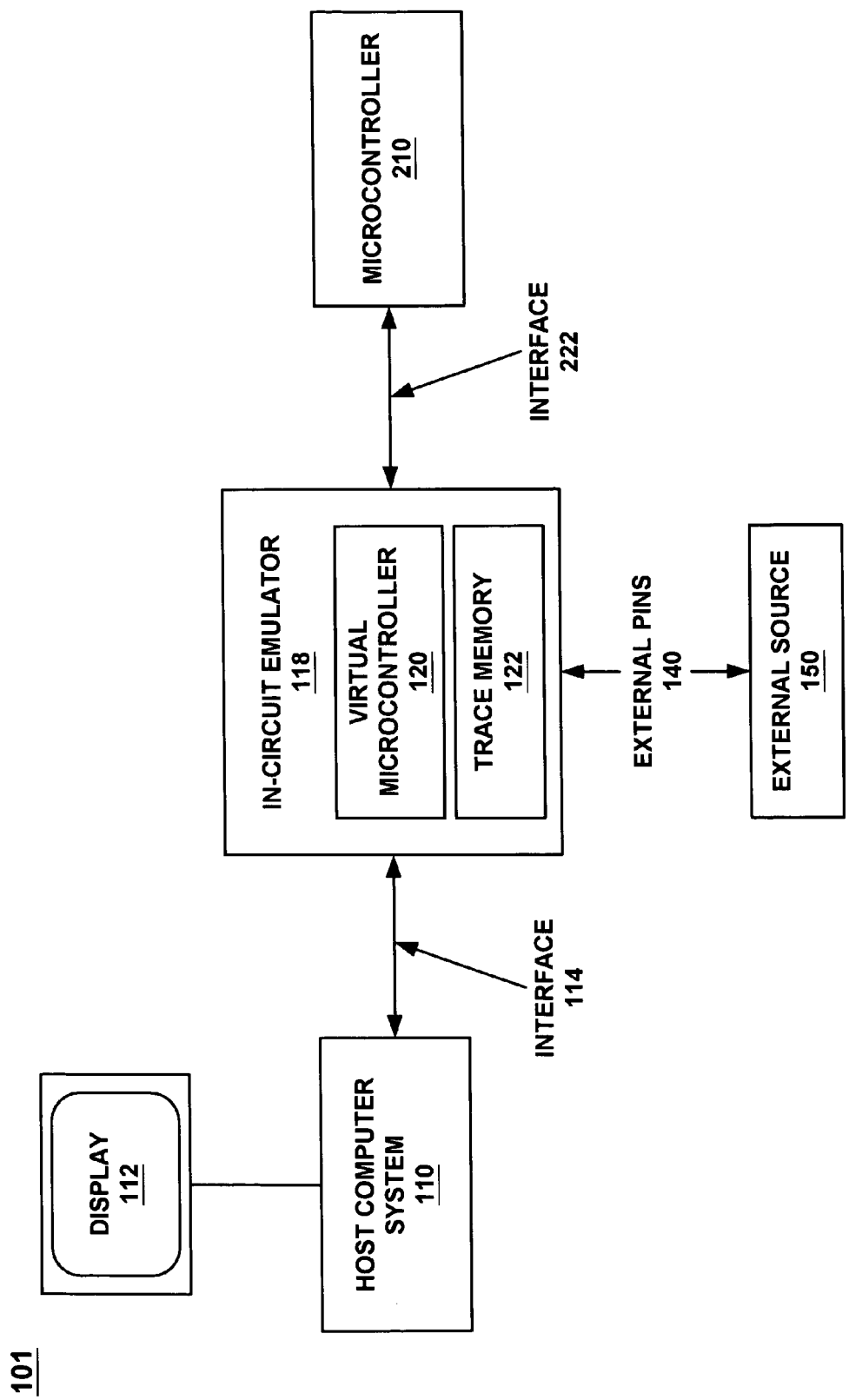
FIG. 1B is a block diagram of an in-circuit emulation system according to one embodiment of the present invention.

FIG. 1B is a block diagram of an in-circuit emulation system 101 according to one embodiment of the present invention. In this embodiment, in-circuit emulator 118 has one or more external pins 140 for interfacing with an external source 150 (alternatively, the pins may be a part of external source 150, with in-circuit emulator 118 configured to receive the pins). In one embodiment, there are eight external pins.

Any relevant information can be carried on the pins 140. In one embodiment, the information received via pins 140 is time-stamped. As mentioned above, in one embodiment, the event and trace information stored in trace memory 122 is also time-stamped. Using the time stamps, external information (e.g., external signals received via pins 140) can be correlated with the activity occurring on microcontroller 210 (or on in-circuit emulator 118). In addition, each set of information can be parsed and displayed on display device 112 as one or more analog and/or digital waveforms.

For example, during emulation and debugging, trace information from microcontroller 210 is captured by in-circuit emulator 118 and stored in trace memory 122. The trace information can include data such as the stack pointer, program counter, accumulator value, scribble pad register, etc. In the present embodiment, one set of trace information is stored and time-stamped for each instruction executed by microcontroller 210. According to the present embodiment of the present invention, along with the trace information, the signals received via pins 140 are also recorded and time-stamped once per instruction. The external signals (from pin 140) and the trace information can be correlated using the time stamps. Accordingly, external data can be introduced and correlated with the information that indicates what microcontroller 210 is doing at the same instant. The information and data so correlated can be displayed as waveforms on display device 112.

As mentioned, the information provided via external pins 140 can be any relevant external signal, for example, the value of a sensor output, a key press on a vending machine, etc. This can help with the debugging process. For instance, consider an application in which a microcontroller is used in a vending machine (represented in FIG. 1B by external source 150). A signal resulting from the press of a key on the vending machine is received via pins 140, recorded in trace memory 122, and time-stamped. The response of microcontroller 210 to the key press is also recorded in trace memory 122 and time-stamped. The two sets of information can be correlated using the time-stamps and analyzed as part of the debugging process, and displayed as waveforms if so desired.

Figure 2A:
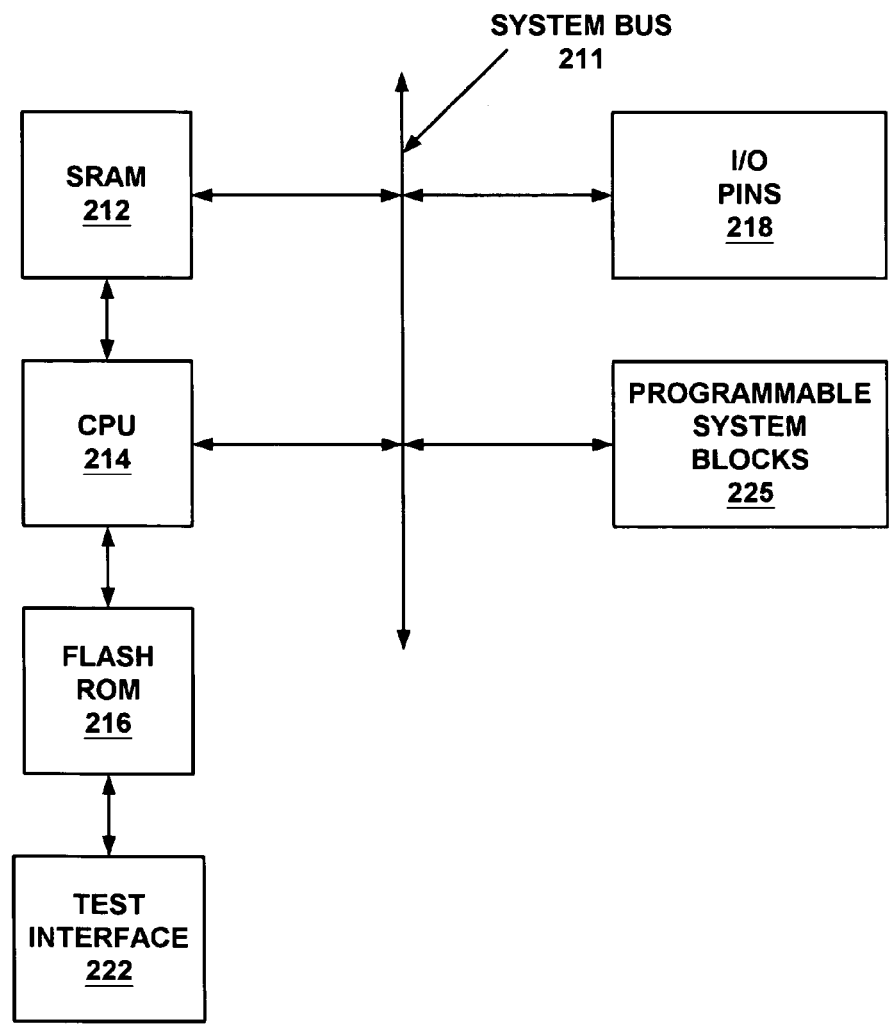
FIG. 2A is a block diagram of an exemplary programmable system architecture that can be used with the various embodiments of the present invention.

FIG. 2A is a block diagram of an integrated circuit (or microcontroller) 210. In the illustrated embodiment, integrated circuit 210 includes a system bus 211, and coupled to bus 211 are synchronous random access memory (SRAM) 212 for storing volatile or temporary data during firmware execution, central processing unit (CPU) 214 for processing information and instructions, flash read-only memory (ROM) 216 for holding instructions (e.g., firmware), input/output (I/O) pins 218 providing an interface with external devices and the like, and programmable system blocks 225. The programmable system blocks 225 include analog blocks and digital blocks. Test interface 222 is for interfacing with in-circuit emulator 100 or 101 of FIGS. 1A and 1B, respectively.

Figure 2B:
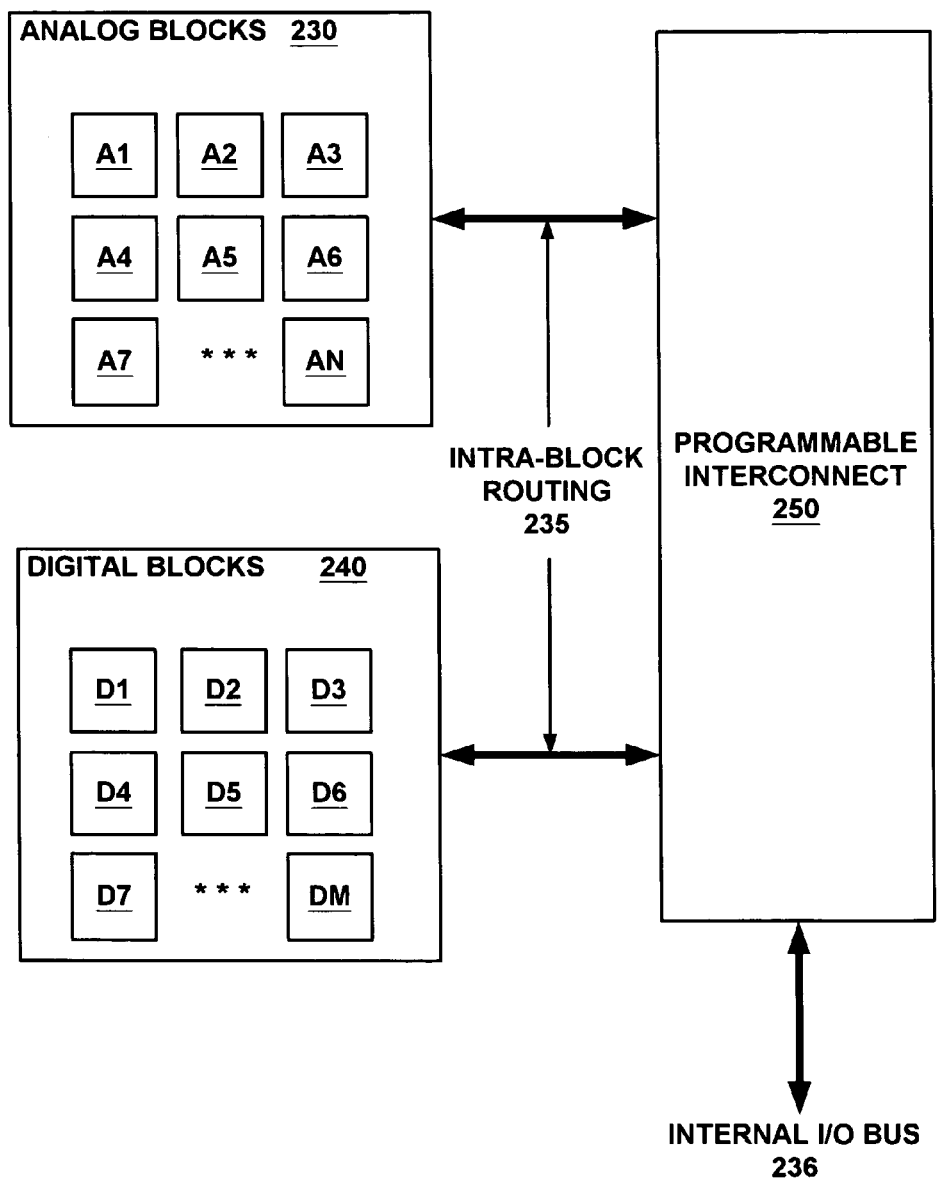
FIG. 2B is a block diagram of an exemplary arrangement of programmable system blocks that can be used with the various embodiments of the present invention.

Referring to FIG. 2B, an embodiment of programmable system block 225 is depicted in greater detail. In this embodiment, programmable system block 225 includes an analog functional block 230, a digital functional block 240, and a programmable interconnect 250. Analog block 230 includes, in the present embodiment, a matrix of interconnected analog blocks A1 through AN. The number N may be any number of analog blocks. Likewise, digital block 240 includes, in the present embodiment, a matrix of interconnected digital blocks D1 through DM. The number M may be any number of digital blocks. The analog blocks A1 through AN and the digital blocks D1 through DM are fundamental building blocks that may be combined in different ways to accomplish different functions. Importantly, different combinations of blocks, producing different functions, may exist at different times within the same system. For example, a set of blocks configured to perform the function of analog-to-digital conversion may sample a signal. After processing that signal in the digital domain, those same blocks (perhaps in conjunction with a few others) may be recombined in a different configuration to perform the function of digital-to-analog conversion to produce an output signal.

Analog blocks 230 and digital blocks 240 are electrically and/or communicatively coupled to programmable interconnect 250, in the present embodiment, by intra-block routing 235. Each individual functional unit, e.g., analog blocks A1 through AN and digital blocks D1 through DM, may communicate and interact with each and/or any other functional unit. Which functional unit communicates with which other functional unit is programmable, in the present embodiment, via the configurability of the programmable interconnect 250. The programmable interconnect 250 is connected via an internal input/output (I/O) bus 236 to pin-by-pin configurable I/O transceivers (pins) 218 (FIG. 2A), which effect communicative coupling between integrated circuit 210 (FIG. 2A) and external modalities.

In the present embodiment, one or more register banks are implemented on microcontroller 210, each of the register banks containing multiple bytes. The information in the registers can be dynamically changed to couple different combinations of blocks, to specify different characteristics of elements within certain of the blocks, or to specify different inputs and outputs for each of the blocks, thereby realizing different functions using the same array of blocks. Importantly, according to the various embodiments of the present invention, the information in these registers can be captured and displayed by in-circuit emulation system 100 or 101 of FIGS. 1A and 1B. In addition, other transient information internal to microcontroller 210 can also be captured and processed for display by in-circuit emulation system 100 or 101. In general, event and trace information from various locations internal to microcontroller 210 can be captured as a function of time and processed for display.

Embodiments of the present invention are particularly useful for configurable microcontroller designs because internal information of interest may not be readily accessible to an external device such as an oscilloscope or logic analyzer. For example, in configuring the microcontroller as an analog-to-digital converter (ADC), the designer may not have made provisions for certain internal information to be made available to external devices. However, according to the present invention, the information in the register(s) configured to implement the ADC can be monitored, sampled, and displayed. Trace information, for example, is sorted from the other microcontroller instructions and calls, placed into the proper sequence according to time stamps, and plotted as a waveform (or waveforms).

Figure 3:
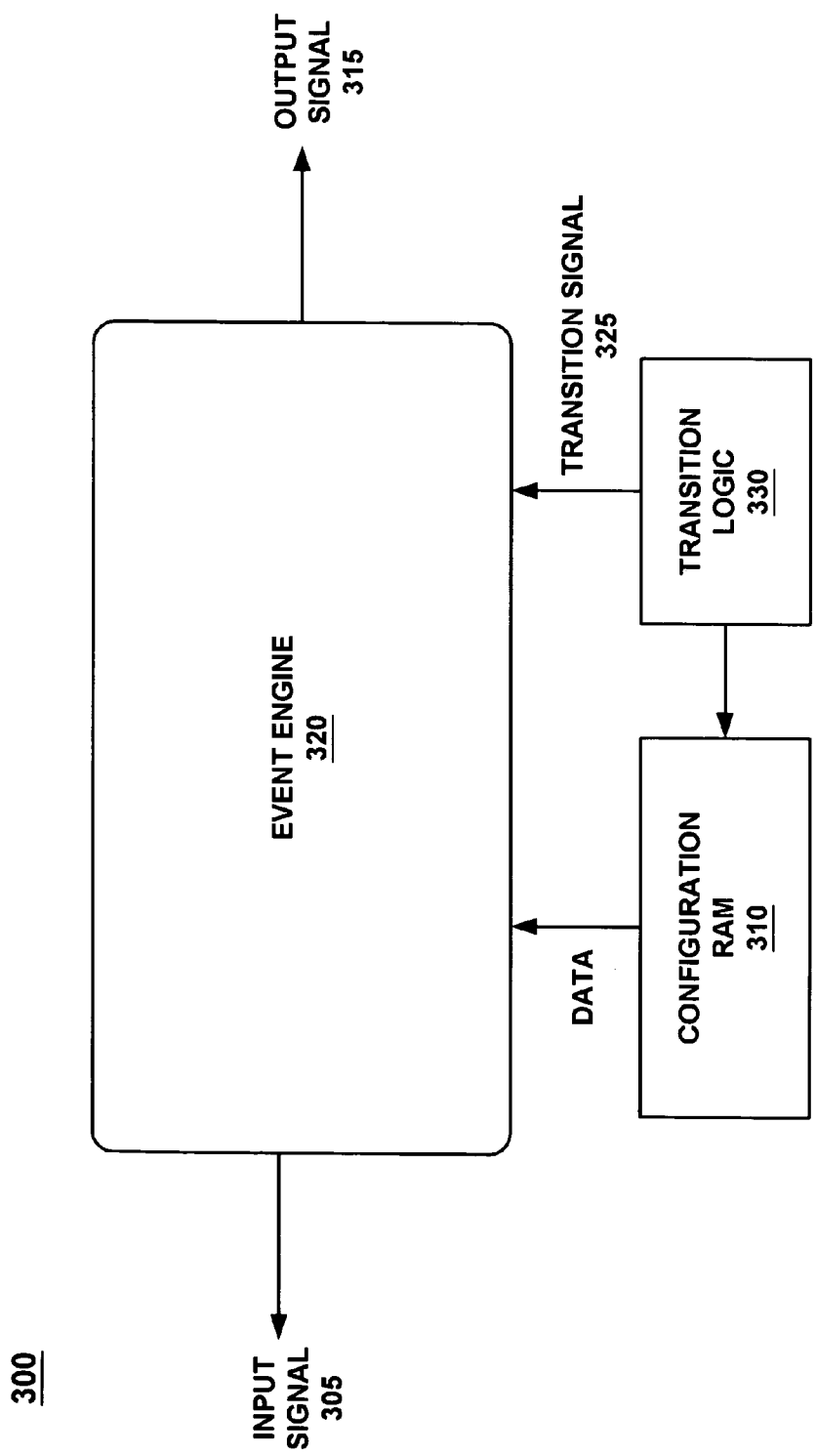
FIG. 3 is a block diagram of a device for implementing a programmable event engine according to the various embodiments of the present invention.

FIG. 3 illustrates an embodiment of a device 300 for implementing an event engine 320. The device 300 comprises programmable logic 310 (e.g., a memory array) for storing data to define a number of states in an event thread to be executed by the event engine 320. Throughout this description, the event engine 320 may also be referred to as execution logic 320. Throughout this description, the programmable logic 310 may also be referred to as configuration random access memory (RAM) 310. In one embodiment, event engine 320 is implemented on in-circuit emulator system 100 or 101 (FIGS. 1A and 1B, respectively). In one such embodiment, event engine 320 is implemented on computer system 110 of FIGS. 1A and 1B.

With reference to FIG. 3, a designer who may be testing and debugging a circuit or software may define an event thread using a software package. The data defining the event thread may then be loaded into the configuration RAM 310. A first portion of the data stored in the configuration RAM 310 may be used to configure or to program the event engine 320 to execute a state of the event thread. Then, new data may be loaded from the configuration RAM 310 to reconfigure the event engine 320 to execute the next state of the event thread.

The event engine 320 receives a number of inputs 305 and may be configured by the data in the configuration RAM 310 to select between the inputs 305. The event engine 320 may also be configured to look for a condition with respect to a selected input signal. Upon the condition's occurrence, the event engine 320 may output none, one, or multiple signals 315. The output signal 315 may be used to initiate an action, such as but not limited to: stopping the execution of the in-circuit emulator or the microcontroller, turning a memory trace on or off, or triggering an external logic pin. The event engine 320 may also be configured by the data in the configuration RAM 310 to select which signal it should output (output signal 315) upon the condition being detected. The event engine 320 may also output a transition signal 325 when the condition it was configured to look for occurs.

The transition signal 325 may be fed into transition logic 330, which upon receiving the transition signal 325, causes a new state to be entered by loading data out of the configuration RAM 310 to reconfigure the event engine 320. In this fashion, the event engine 320 may be reconfigured on the fly or during the execution of an event thread.

Figure 4:
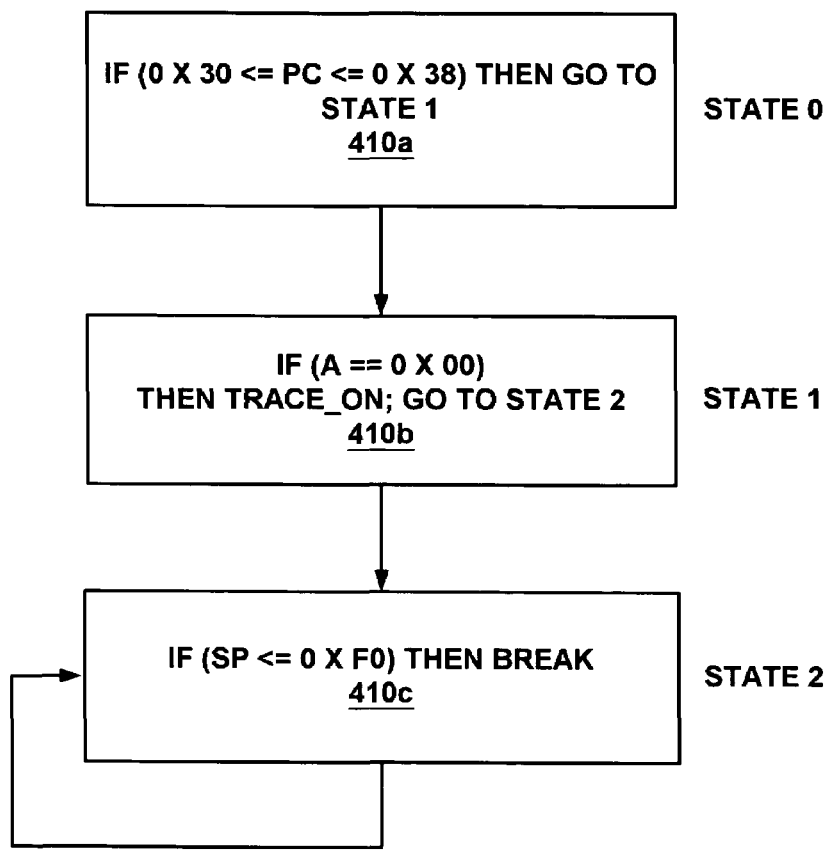
FIG. 4 is a diagram illustrating an event thread executed according to the various embodiments of the present invention.

FIG. 4 illustrates an exemplary event thread 400 that may be executed in the event engine 320 (FIG. 3) and also in other embodiments of the present invention. The exemplary event thread 400 has three event cells 410a, 410b and 410c, each event cell 410a–c corresponding to one state of the event thread 400. Embodiments program or load the configuration RAM 310 (FIG. 3) with data that describes the event thread 400. In this example, during state 0, some of the data is used to configure the event engine 320 to monitor for the condition of the program counter being between 0x30 and 0x38. When this condition occurs, the event engine 320 is put into state 1 by the transition logic 330 (FIG. 3). This causes the configuration RAM 310 to reconfigure the event engine 320 to monitor for the condition of the accumulator equal to 0xcc. When this condition occurs, the event engine 320 causes a trace to be turned on by outputting an appropriate signal. Additionally, state 2 is loaded. In state 2, the event engine 320 looks for the condition of the stack pointer greater than or equal to 0xf0. When this occurs, the event engine 320 causes a breakpoint signal to be output, which may stop the execution of, for example, code running in a microcontroller. When this occurs, state 2 is reloaded, which causes the event engine 320 to continue to monitor the stack pointer and to issue a break signal when, for example, the stack pointer is out of a valid range.

Figure 5:
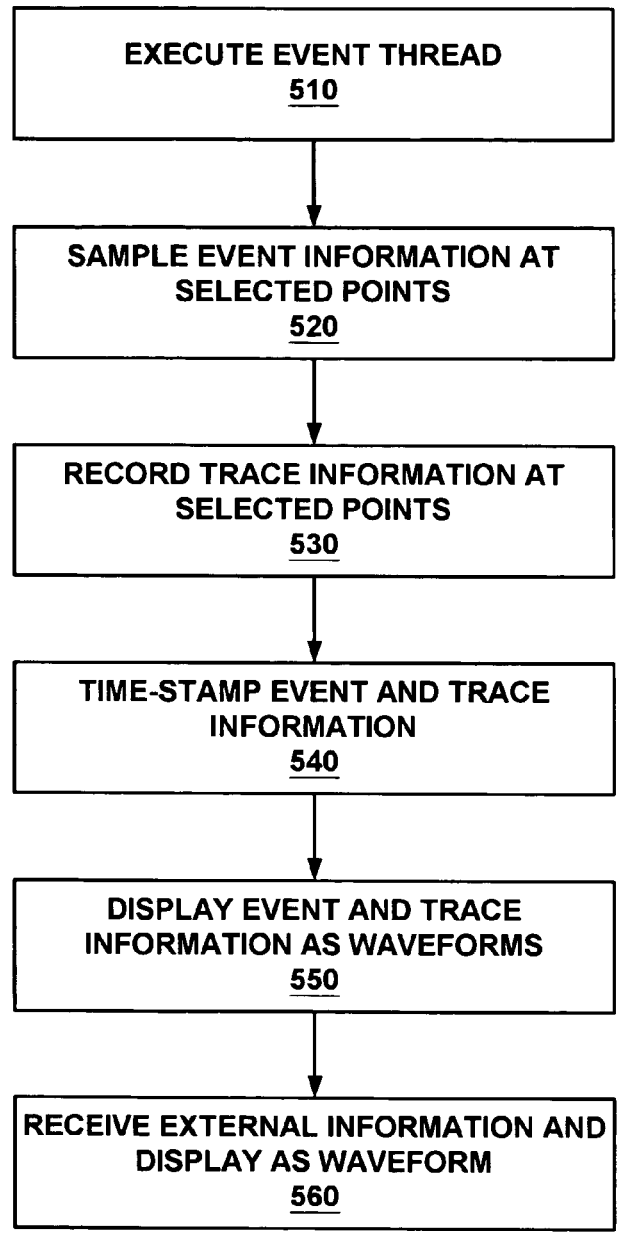
FIG. 5 is a flowchart of a method for emulating and debugging a microcontroller in accordance with one embodiment of the present invention.

FIG. 5 is a flowchart 500 of a method for emulating and debugging a microcontroller in accordance with one embodiment of the present invention. Flowchart 500 includes processes of the present invention that, in one embodiment, are carried out by a processor under the control of computer-readable and computer-executable instructions. Although specific steps are disclosed in flowchart 500, such steps are exemplary. That is, the present invention is well suited to performing various other steps or variations of the steps recited in flowchart 500. It is appreciated that the steps in flowchart 500 may be performed in an order different than presented, and that not all of the steps in flowchart 500 may be performed.

In step 510, an event thread is executed in an in-circuit emulator system operating in lock-step with a device under test (e.g., a microcontroller). In one embodiment, the event thread (exemplified by event thread 400 of FIG. 4) is executed on in-circuit emulator system 100 or 101 of FIGS. 1A and 1B, respectively.

In step 520 of FIG. 5, the event information being generated as a result of the execution of the event thread (in step 510) is sampled at selected points. In one embodiment, in-circuit emulator system 100 (or 101) is configured to detect a particular condition. Event information that is present at the time the condition is detected can be sampled and recorded in trace memory 122 (FIGS. 1A and 1B). As mentioned above, information internal to microcontroller 210 (FIGS. 1A and 1B), including information such as the dynamic information in the registers used to configure the microcontroller, can be sampled and recorded. Such information may not be readily accessible by a conventional logic analyzer or oscilloscope.

In step 530 of FIG. 5, in one embodiment, in response to detection of the condition as described by step 520, trace memory can be started and stopped to record trace information present at the time that the condition is detected. Thus, in steps 520 and 530, a subset of the total amount of event information and trace information is sampled and recorded (stored). The subset of information so recorded is defined and implemented according to the event thread being executed. As such, the event information and trace information are effectively pre-filtered. Accordingly, it is not incumbent on the designer to read and understand the event and trace information, sort out the information that is of interest, and arrange it in a way that is meaningful. Instead, in essence this is done automatically according to the present embodiment of the present invention, based on the definition of the event thread. As a result, this task is facilitated, and the probability of error is substantially reduced. Furthermore, because only selected event and trace information is recorded, the resources of the in-circuit emulator system are not taxed. That is, for example, memory resources can be more effectively utilized because only the information that is of interest and that will be plotted as waveforms is collected.

Continuing with reference to FIG. 5, in step 540, according to the present embodiment, the event information and trace information from steps 520 and 530 are time-stamped. In step 550, the event and trace information is displayed as one or more analog and/or digital waveforms. In one embodiment, because the information is time-stamped, it can be parsed and plotted. In another embodiment, the event and trace information can be formatted in a way that permits it to be output and read by display systems or graphing software, for example, using comma-separated text. In one embodiment, this is accomplished by formatting a parallel set of information in a way that is compatible with plotting programs.

In step 560, in one embodiment, external information is received by in-circuit emulator system 101 (FIG. 1B) via the external pins 140. This information can also be sampled at the same selected points as the event and trace information. In one embodiment, the sampled external information is also time-stamped so that it can be correlated with the time-stamped event and trace information. The external information can then also be displayed as a waveform along with the waveforms for the event and trace information.

Figure 6:
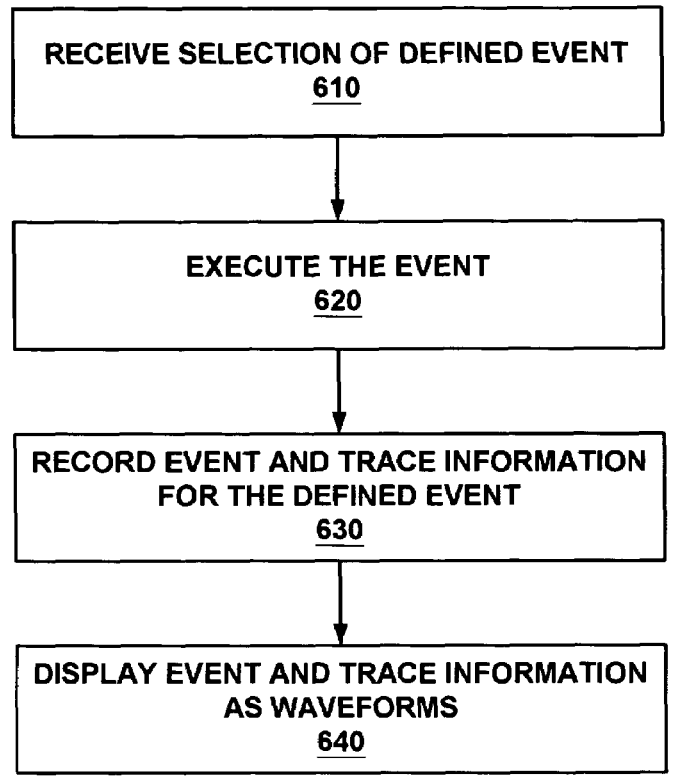
FIG. 6 is a flowchart of a method for emulating and debugging a microcontroller in accordance with another embodiment of the present invention.

FIG. 6 is a flowchart 600 of a method for emulating and debugging a microcontroller in accordance with another embodiment of the present invention. Flowchart 600 includes processes of the present invention that, in one embodiment, are carried out by a processor under the control of computer-readable and computer-executable instructions. Although specific steps are disclosed in flowchart 600, such steps are exemplary. That is, the present invention is well suited to performing various other steps or variations of the steps recited in flowchart 600. It is appreciated that the steps in flowchart 600 may be performed in an order different than presented, and that not all of the steps in flowchart 600 may be performed.

In step 610, in the present embodiment, the selection of an event is received. According to this embodiment of the present invention, events are defined ahead of time, and the designer is presented with a graphical user interface allowing the user to select one of the predefined events. The event definition prescribes the event information and trace information to be collected when the event is executed. Alternatively, the designer can be presented with a list of the variables that can be monitored and recorded during event execution; the designer can then select from that list.

In step 620, the selected event is executed. In step 630, the event and trace information defined for the selected event, or for the variables selected by the designer, are recorded and stored. In one embodiment, the recorded information is time-stamped. In step 640, the recorded event and trace information are displayed as analog and/or digital waveforms.

Relative to the embodiment of FIG. 5, the present embodiment provides a more automated process. The designer is presented with a list of predefined events from which to make a selection. Thus, some of the tasks performed by the designer to set up and execute an event thread are instead performed automatically. In addition, the processing of the recorded event and trace information can also be accomplished in a more automatic fashion.

In summary, embodiments of the present invention provide a system that can be used for emulating and debugging devices such as microcontrollers, but that do not incur the hardware, maintenance and training costs associated with logic analyzers and oscilloscopes. Embodiments of the present invention also provide a system that can allow access to information that generally is difficult to access or cannot be accessed by conventional logic analyzers and oscilloscopes. Embodiments of the present invention also provide a system that can accomplish this without having to place undue burdens on the designer and on available computational (e.g., memory) resources.

According to the various embodiments of the present invention, an in-circuit emulator system can be used to integrate trace and event information, as well as information and data from external sources and signals. In one embodiment, the information is time-stamped, and the time stamps are used to correlate the information. Information can be selectively recorded, or selectively retrieved from memory, for subsequent processing. The information can also be selectively displayed as analog and/or digital waveforms. Accordingly, the in-circuit emulator system can be used as an oscilloscope and/or as a logic analyzer, obviating the need for the acquisition and maintenance of a separate oscilloscope and/or logic analyzer.

The preferred embodiment of the present invention, system for integrating event-related information and trace information, is thus described. While the present invention has been described in particular embodiments, it should be appreciated that the present invention should not be construed as limited by such embodiments, but rather construed according to the below claims.

What is claimed is:

1. An emulation and debugging system comprising:
   an in-circuit emulator couplable to a microcontroller, said in-circuit emulator adapted to execute an event thread in lock-step with said microcontroller and further adapted to detect a condition defined for said thread, wherein event information generated as a result of executing said event thread is sampled in response to detecting said condition and wherein sampled event information is stored in memory;
   wherein trace information is recorded in a trace memory that is started at the time said condition is detected and then stopped, wherein event information and trace information corresponding to said condition are automatically pre-filtered; and wherein time-stamps are applied to said sampled event information and recorded trace information, and wherein further said time-stamps are used to display said sampled event information and said recorded trace information as timewise waveforms.

2. The system of claim 1 comprising:
a display device coupled to said in-circuit emulator, said display device operable to display a first waveform representing said sampled event information and a second waveform representing said recorded trace information.

3. The system of claim 1 comprising:
an external pin coupled to said in-circuit emulator, wherein a signal received via said external pin is sampled and correlated with said recorded trace information.

4. The system of claim 3 wherein said signal is time-stamped.

5. The system of claim 3 wherein said signal is displayed as a waveform.

6. The system of claim 1 wherein said microcontroller is a mixed signal microcontroller for processing analog and digital signals.

7. An emulation and debugging system comprising:
an in-circuit emulator coupled to a microcontroller; and
a plurality of external pins coupled to said in-circuit emulator;
said in-circuit emulator adapted to execute an event in lock-step with said microcontroller, said event executed according to an event description comprising event points, said in-circuit emulator further adapted to sample event information and to sample trace information corresponding to occurrences of said event points, wherein sampled trace information is recorded in a trace memory that is started in response to said occurrences of said event points and then stopped, wherein said event information and trace information are automatically pre-filtered;
wherein information received by said in-circuit emulator via an external pin is correlated with sampled event information and said sampled trace information; and
wherein time-stamps are applied to said sampled event information, said sampled trace information and said information received via said external pin and wherein further said time-stamps are used to display said sampled event information, said sampled trace information and said information received via said external pin as timewise waveforms.

8. The system of claim 7 wherein said in-circuit emulator is adapted to apply said time-stamps.

9. The system of claim 7 wherein said information received via said external pin comprises a signal that is output from an external source coupled to said external pin.

10. The system of claim 7 wherein said microcontroller is a mixed signal microcontroller for processing analog and digital signals.

11. An in-circuit emulator comprising:
a programmable logic device operable to execute an event thread in lock-step with a microcontroller, said event thread comprising event points; and
memory coupled to said programmable logic device;
wherein upon occurrence of an event point, event information and trace information corresponding to said event point are sampled and wherein sampled event information and sampled trace information corresponding to said event point are stored in said memory, wherein said sampled trace information is stored in a trace memory that is started in response to said event point and then stopped, wherein said event information and said trace information are automatically pre-filtered;
wherein said sampled event information and said sampled trace information are plotted as timewise waveforms.

12. The in-circuit emulator of claim 11 wherein said sampled event information and said sampled trace information are time-stamped.

13. The in-circuit emulator of claim 11 comprising:
a plurality of external pins coupled to said programmable logic device, said external pins for carrying information from an external source.

14. The in-circuit emulator of claim 13 wherein said information from external source is sampled upon occurrence of said event point and correlated with said sampled event information and said sampled trace information.

15. The in-circuit emulator of claim 14 wherein said information from said external source is plotted along with plots of said sampled event information and said sampled trace information.

* * * * *